US011804936B2

(12) United States Patent
Ren et al.

(10) Patent No.: US 11,804,936 B2
(45) Date of Patent: Oct. 31, 2023

(54) NARROWBAND DEMODULATION REFERENCE SIGNAL BUNDLING FOR PHYSICAL DOWNLINK CONTROL CHANNELS

(71) Applicant: QUALCOMM Incorporated, San Diego, CA (US)

(72) Inventors: Yuwei Ren, Beijing (CN); Huilin Xu, Temecula, CA (US); Peter Pui Lok Ang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 168 days.

(21) Appl. No.: 17/595,228

(22) PCT Filed: May 31, 2019

(86) PCT No.: PCT/CN2019/089458
§ 371 (c)(1),
(2) Date: Nov. 11, 2021

(87) PCT Pub. No.: WO2020/237614
PCT Pub. Date: Dec. 3, 2020

(65) Prior Publication Data
US 2022/0209917 A1 Jun. 30, 2022

(51) Int. Cl.
*H04L 5/00* (2006.01)
(52) U.S. Cl.
CPC .......... *H04L 5/0051* (2013.01); *H04L 5/0064* (2013.01)
(58) Field of Classification Search
CPC ............................ H04L 5/0051; H04L 5/0064
See application file for complete search history.

(56) References Cited

U.S. PATENT DOCUMENTS

2019/0150123 A1   5/2019  Nogami et al.
2020/0367242 A1  11/2020  Moon et al.

FOREIGN PATENT DOCUMENTS

| CN | 103312483 A | 9/2013 |
| CN | 107046431 A | 8/2017 |
| WO | 2018160015 A1 | 9/2018 |
| WO | WO-2018199685 A1 | 11/2018 |

OTHER PUBLICATIONS

NTT DOCOMO Inc: "DM-RS Pattern Design for NR-PDCCH", 3GPP TSG RAN WG1 Meeting #8 9, R1-1708464, 3rd Generation Partnership Project, Mobile Competence Centre, 650, Route Des Lucioles, F-06921 Sophia-Antipolis Cedex, France, vol. RAN WG1, No. Hangzhou, May 15, 2017-May 19, 2017, May 14, 2017, 9 Pages, XP051273656, Sec. 2, 3, Figures 1, 2.

(Continued)

*Primary Examiner* — Derrick V Rose
(74) *Attorney, Agent, or Firm* — Harrity & Harrity LLP/Qualcomm Incorporated

(57) ABSTRACT

Various aspects of the present disclosure generally relate to wireless communication. In some aspects, a base station (BS) may process, for a plurality of search space (SS) set occasions, a plurality of narrowband (NB) demodulation reference signals (DMRSs) using a common precoder in a common resource element group (REG). The BS may transmit the plurality of NB DMRSs within a union of REGs of each physical downlink control channel for each aggregation level configured for the plurality of SS set occasions. Numerous other aspects are provided.

22 Claims, 5 Drawing Sheets

(56) References Cited

OTHER PUBLICATIONS

Qualcomm Incorporated: "Remaining Open Issues on PDCCH Structure", 3GPP TSG RAN WG1 NR AdHoc#3, R1-1716413, 3rd Generation Partnership Project, 650, Route Des Mobile Competence Centre, Lucioles, F-06921 Sophia-Antipolis Cedex, France vol. RAN WG1, No. Nagoya, Japan, Sep. 18, 2017-Sep. 21, 2017, Sep. 12, 2017, 4 Pages, XP051330002.
Supplementary European Search Report—EP19930879—Search Authority—The Hague—dated Nov. 29, 2022.
International Search Report and Written Opinion—PCT/CN2019/089458—ISA/EPO—dated Mar. 6, 2020.

NARROWBAND DEMODULATION REFERENCE SIGNAL BUNDLING FOR PHYSICAL DOWNLINK CONTROL CHANNELS

CROSS-REFERENCE TO RELATED APPLICATION

This application is a 371 national stage of PCT Application No. PCT/CN2019/089458 filed on May 31, 2019, entitled "NARROWBAND DEMODULATION REFERENCE SIGNAL BUNDLING FOR PHYSICAL DOWNLINK CONTROL CHANNELS," which is hereby expressly incorporated by reference herein.

TECHNICAL FIELD

Aspects of the technology described below generally relate to wireless communication and to techniques and apparatuses for narrowband demodulation reference signal bundling for physical downlink control channels. Some techniques and apparatuses described herein enable and provide wireless communication devices and systems configured for enhanced channel estimation accuracy and efficient communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. A BS may be referred to as a Node B, a gNB, an access point (AP), a radio head, a transmit receive point (TRP), a New Radio (NR) BS, a 5G Node B, and/or the like.

Multiple access technologies have been adopted in various telecommunication standards. Wireless communication standards provide common protocols to enable different devices (e.g., user equipment) to communicate on a municipal, national, regional, and even global level. New Radio (NR), which may also be referred to as 5G, is a set of enhancements to the LTE mobile standard promulgated by the Third Generation Partnership Project (3GPP). As demand for mobile broadband access continues to increase, there exists a need for further improvements in LTE and NR technologies. These improvements can apply to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. The purpose of the summary is to present some concepts of one or more aspects of the disclosure in summary form as a prelude to the more detailed description that is presented later.

In some communications systems, such as NR, a user equipment (UE) may receive a plurality of demodulation reference signal (DMRS) transmissions, which may be referred to as DMRSs, associated with a plurality of different time intervals, and may perform DMRS time domain bundling to improve an accuracy of channel estimation by coherently filtering the plurality of DMRS transmissions. A base station (BS) may transmit a DMRS in a segment of contiguous resource blocks allocated to a control resource set (CORESET) when at least one resource element group (REG) bundle of a physical downlink control channel (PDCCH) conveying the DMRS is transmitted in the segment of contiguous resource blocks (RBs).

Each REG may include an RB (e.g., a single RB) during an orthogonal frequency division multiplexing (OFDM) symbol (e.g., a single OFDM symbol). REGs may be defined in a physical resource domain and each REG of a CORESET may be indexed with an increasing index value (e.g., increasing in connection with time, such that a REG including a sequentially first OFDM symbol and a lowest-indexed RB in CORESET is indexed 0). A REG bundle may be a smallest physical resource unit allocatable to a PDCCH and may include a plurality of consecutive REGs, such as 2 REGs, 3 REGs, or 6 REGs (the quantity of REGs in a REG bundle may be configured on a per CORESET basis).

A physical resource of a plurality of REGs (e.g., 6 REGs) may be a control-channel element (CCE), which may be defined in a virtual resource domain. Each PDCCH may be assigned to a particular quantity of consecutive CCEs where the particular quantity is an aggregation level for the PDCCH. Thus, a CCE may be a virtual resource domain resource that maps to one or more REG bundles in a physical resource domain in accordance with a CCE-to-REG mapping function for distributive or sequential mapping. For example, each CCE may map to 3 REGs (e.g., for a REG bundle size of 2), 2 REGs (e.g., for a REG bundle size of 3), or 1 REG (e.g., for a REG bundle size of 6). During resource allocation for a PDCCH, a set of continuously numbered CCEs may be assigned to the PDCCH, and the assigned set of continuously numbered CCEs may be mapped to REG bundles associated with physical time resources and frequency resources of a frequency resource grid.

A CORESET may define a set of frequency domain RB allocations and OFDM symbol time domain allocations of a control region for PDCCH monitoring. The CORESET may be organized into a plurality of search space (SS) set occasions. The plurality of SS set occasions may be associated with an SS set configuration that indicates a time domain pattern, periodicity, quantity of slots, quantity of symbols, and/or the like for monitoring for the PDCCH. Each slot of the CORESET may be configured with a plurality of SS set occasions which may, collectively, form an SS set for PDCCH monitoring. Each SS set may be configured with a set of aggregation levels and a quantity of PDCCH candidates for each aggregation level. A BS may select one or more of the PDCCH candidates for transmitting a downlink control information (DCI) and the UE may monitor all of the PDCCH candidates to attempt to receive the DCI.

However, when the BS transmits a PDCCH in a plurality of adjacent SS set occasions (e.g., of the same SS set or of a plurality of different SS sets within the same CORESET), the BS may select any PDCCH candidate in which to transmit the PDCCH and may use a common precoder. For example, for a group of 4 SS sets each including 4 PDCCH candidates, the BS may transmit a first PDCCH in a first PDCCH candidate of a first SS set occasion, a second PDCCH in a third PDCCH candidate of a second SS set occasion, a third PDCCH in a fourth PDCCH candidate of a third SS set occasion, and a fourth PDCCH in a second PDCCH candidate of a fourth SS set occasion. In this case, each PDCCH may be associated with a DMRS precoded using a common precoder. As a result of transmitting the PDCCH in different PDCCH candidates of adjacent SS set occasions and using the common precoder, the UE may be unable to perform coherent filtering on the DMRSs of the PDCCH, thereby reducing an accuracy of channel estimation. Further, the BS may fail to transmit a PDCCH in one or more SS set occasions of an SS set, which may prevent coherent filtering on the DMRSs. In another case, even when the BS does transmit the PDCCH on the same PDCCH candidate across a plurality of SS set occasions, the BS may use different precoders for a common PDCCH candidate across the plurality of SS set occasions, which may prevent coherent filtering.

Some aspects described herein enable narrowband (NB) DMRS bundling for PDCCHs. For example, a BS may transmit an NB DMRS in a union of REGs of all PDCCH candidates for all aggregation levels configured for an SS set, even when a PDCCH is not transmitted in a PDCCH candidate. In this case, the BS may use a common precoder for each REG with a common index value across a plurality of SS set occasions. In this way, the BS may enable coherent filtering of the DMRS, thereby improving channel estimation when using an NB DMRS.

In some aspects, a method of wireless communication, performed by a user equipment (UE), may include determining that demodulation reference signal (DMRS) bundling is enabled for a plurality of narrowband (NB) DMRSs for resources corresponding to a union of resource element groups (REGs) of each physical downlink control channel (PDCCH) for each aggregation level (AL) configured for a plurality of search space (SS) set occasions; and rate matching a physical downlink shared channel (PDSCH) around one or more resources reserved for transmitting the plurality of NB DMRSs.

In some aspects, a UE for wireless communication may include memory and one or more processors operatively coupled to the memory. The memory and the one or more processors may be configured to determine that DMRS bundling is enabled for a plurality of NB DMRSs for resources corresponding to a union of REGs of each PDCCH for each AL configured for a plurality of SS set occasions; and rate matching a PDSCH around one or more resources reserved for transmitting the plurality of NB DMRSs.

In some aspects, a non-transitory computer-readable medium may store one or more instructions for wireless communication. The one or more instructions, when executed by one or more processors of a UE, may cause the one or more processors to: process, for a plurality of SS set occasions, a plurality of NB DMRSs using a common precoder in a common REG; and transmit the plurality of NB DMRSs within a union of REGs of each PDCCH for each AL configured for the plurality of SS set occasions.

In some aspects, a non-transitory computer-readable medium may store one or more instructions for wireless communication. The one or more instructions, when executed by one or more processors of a UE, may cause the one or more processors to: determine that DMRS bundling is enabled for a plurality of NB DMRSs for resources corresponding to a union of REGs of each PDCCH for each AL configured for a plurality of SS set occasions; and rate matching a PDSCH around one or more resources reserved for transmitting the plurality of NB DMRSs.

In some aspects, an apparatus for wireless communication may include means for processing, for a plurality of SS set occasions, a plurality of NB DMRSs using a common precoder in a common REG; and means for transmitting the plurality of NB DMRSs within a union of REGs of each PDCCH for each AL configured for the plurality of SS set occasions.

In some aspects, an apparatus for wireless communication may include means for determining that DMRS bundling is enabled for a plurality of NB DMRSs for resources corresponding to a union of REGs of each PDCCH for each AL configured for a plurality of SS set occasions; and rate matching a PDSCH around one or more resources reserved for transmitting the plurality of NB DMRSs.

In some aspects, a method of wireless communication, performed by a BS, may include processing, for a plurality of SS set occasions, a plurality of NB DMRSs using a common precoder in a common REG; and transmitting the plurality of NB DMRSs within a union of REGs of each PDCCH for each AL configured for the plurality of SS set occasions.

In some aspects, a BS for wireless communication may include memory and one or more processors operatively coupled to the memory. The memory and the one or more processors may be configured to process, for a plurality of SS set occasions, a plurality of NB DMRSs using a common precoder in a common REG; and transmit the plurality of NB DMRSs within a union of REGs of each PDCCH for each AL configured for the plurality of SS set occasions.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description is provided herein, with some aspects of the disclosure being illustrated in the appended drawings. However, the appended drawings illustrate only some aspects of this disclosure and are therefore not to be considered limiting of the scope of the disclosure. The same reference numbers in different drawings may identify the same or similar elements.

DETAILED DESCRIPTION

Figure 1:
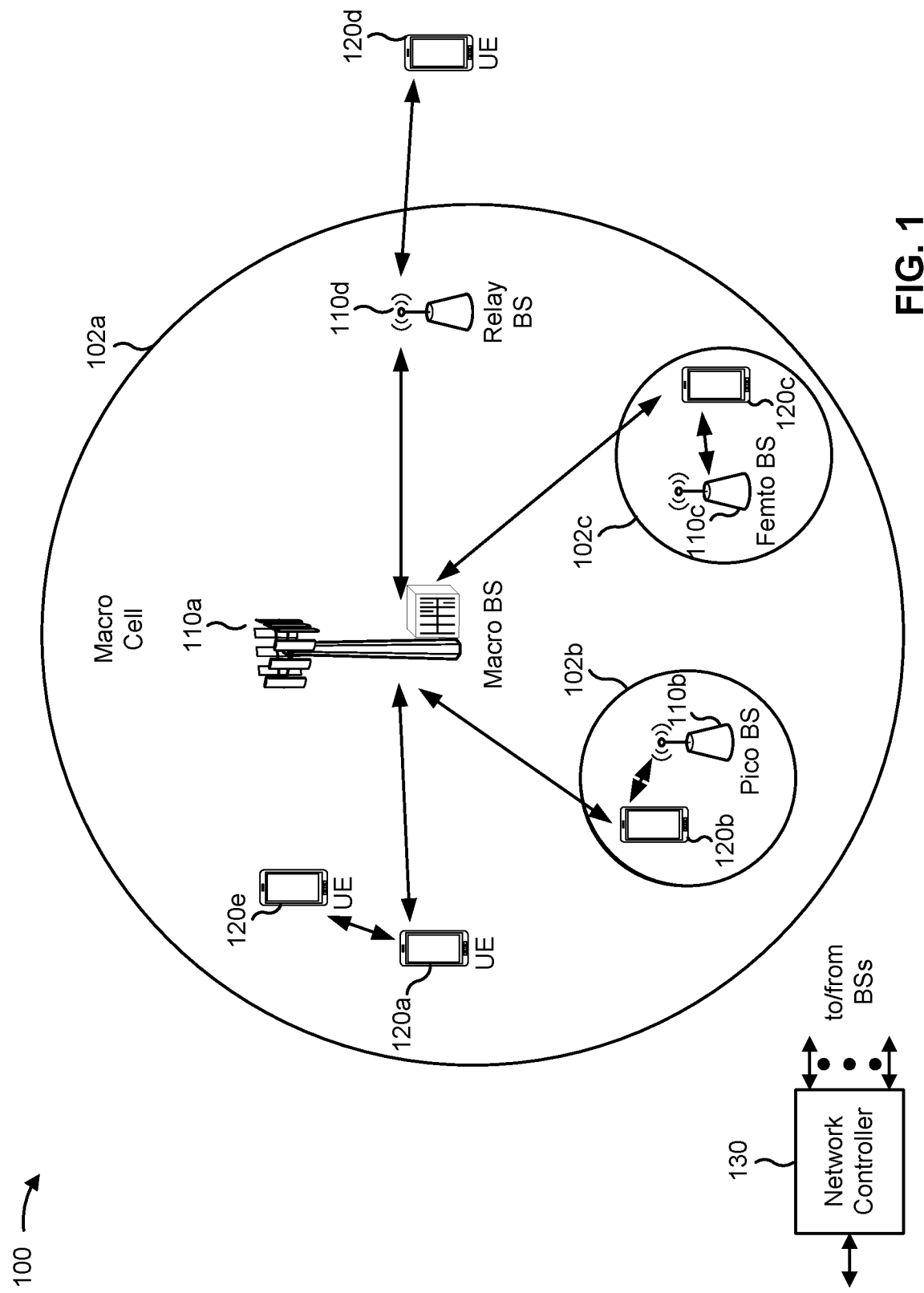
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements" or "features"). These elements may be implemented using hardware, software, or combinations thereof. Whether such elements are implemented as hardware or software depends upon the particular application and design constraints imposed on the overall system.

While some aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, RF-chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular area (e.g., a fixed or changing geographical area). In some scenarios, BSs 110 may be stationary or non-stationary. In some non-stationary scenarios, mobile BSs 110 may move with varying speeds, direction, and/or heights. In 3GPP, the term "cell" can refer to a coverage area of a BS 110 and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. Additionally, or alternatively, a BS may support access to an unlicensed RF band (e.g., a Wi-Fi band and/or the like). A pico cell may cover a relatively small geographic area and may allow unrestricted access by UEs with service subscription.

A femto cell may cover a relatively small geographic area (e.g., a home) and may allow restricted access by UEs having association with the femto cell (e.g., UEs in a closed subscriber group (CSG)). A BS for a macro cell may be referred to as a macro BS. ABS for a pico cell may be referred to as a pico BS. ABS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network. In other scenarios, BSs may be implemented in a software defined network (SDN) manner or via network function virtualization (NFV) manner.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, robotics, drones, implantable devices, augmented reality devices, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like. These components may be integrated in a variety of combinations and/or may be stand-alone, distributed components considering design constraints and/or operational preferences.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110. A UE performing scheduling operations can include or perform base-station-like functions in these deployment scenarios.

As indicated above, FIG. 1 is provided merely as an example. Other examples may differ from what is described with regard to FIG. 1.

Figure 2:
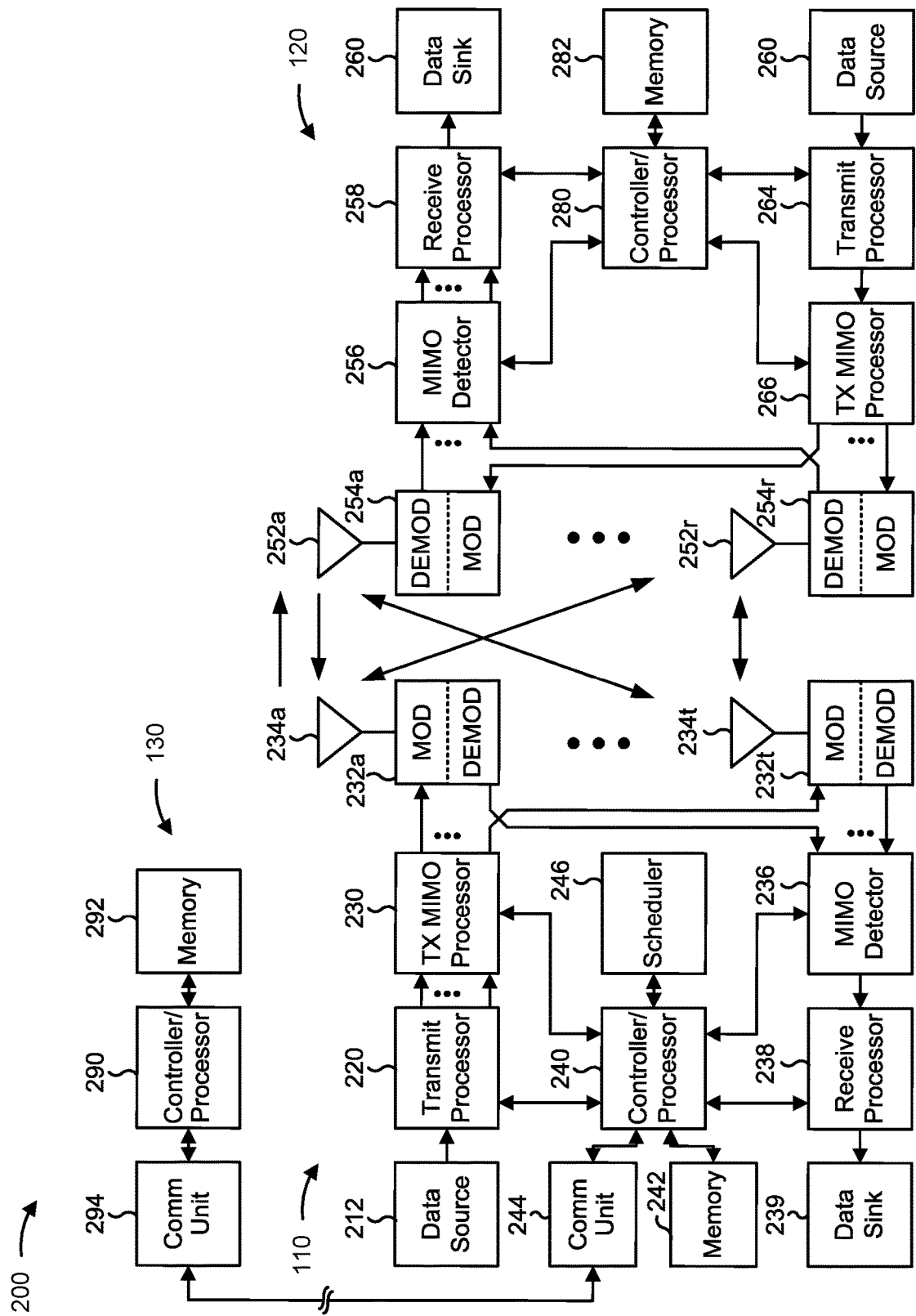
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1. The T and R antennas may be configured with multiple antenna elements formed in an array for MIMO or massive MIMO deployments that can occur in millimeter wave (mmWave or mmW) communication systems.

At base station 110, a transmit processor 220 can carry out a number of functions associated with communications. For example, transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive downlink RF signals. The downlink RF signals may be received from and/or may be transmitted by one or more base stations 110. The signals can be provided to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

For uplink communications, a UE 120 may transmit control information and/or data to another device, such as one or more base stations 110. For example, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with narrowband demodulation reference signal bundling for physical downlink control channels, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. A scheduler 246 may schedule UEs for data transmission on the downlink and/or uplink.

In some aspects, the UE 120 may include a variety of means or components for implementing communication functions. For example, the variety of means may include means for determining that demodulation reference signal (DMRS) bundling is enabled for a plurality of narrowband (NB) DMRSs for resources corresponding to a union of resource element groups (REGs) of each physical downlink control channel (PDCCH) for each aggregation level (AL) configured for a plurality of search space (SS) set occasions, means for rate matching a physical downlink shared channel (PDSCH) around one or more resources reserved for transmitting the plurality of NB DMRSs, and/or the like.

In some aspects, the UE 120 may include a variety of structural components for carrying out functions of the various means. For example, structural components that carry out functions of such means may include one or more components of UE 120 described in connection with FIG. 2, such as antenna 252, DEMOD 254, MOD 254, MIMO detector 256, receive processor 258, transmit processor 264, TX MIMO processor 266, controller/processor 280, and/or the like.

In some aspects, the BS 110 may include a variety of means or components for implementing communication functions. For example, the variety of means may include means for processing, for a plurality of SS set occasions, a plurality of NB DMRSs using a common precoder in a common REG, means for transmitting the plurality of NB DMRSs within a union of REGs of each PDCCH for each AL configured for the plurality of SS set occasions, and/or the like.

In some aspects, the BS 110 may include a variety of structural components for carrying out functions of the various means. For example, structural components that carry out functions of such means may include one or more components of UE 120 described in connection with FIG. 2, such as antenna 234, DEMOD 232, MOD 232, MIMO detector 236, receive processor 238, transmit processor 220, TX MIMO processor 230, controller/processor 240, and/or the like.

As indicated above, FIG. 2 is provided merely as an example. Other examples may differ from what is described with regard to FIG. 2.

Figure 3:
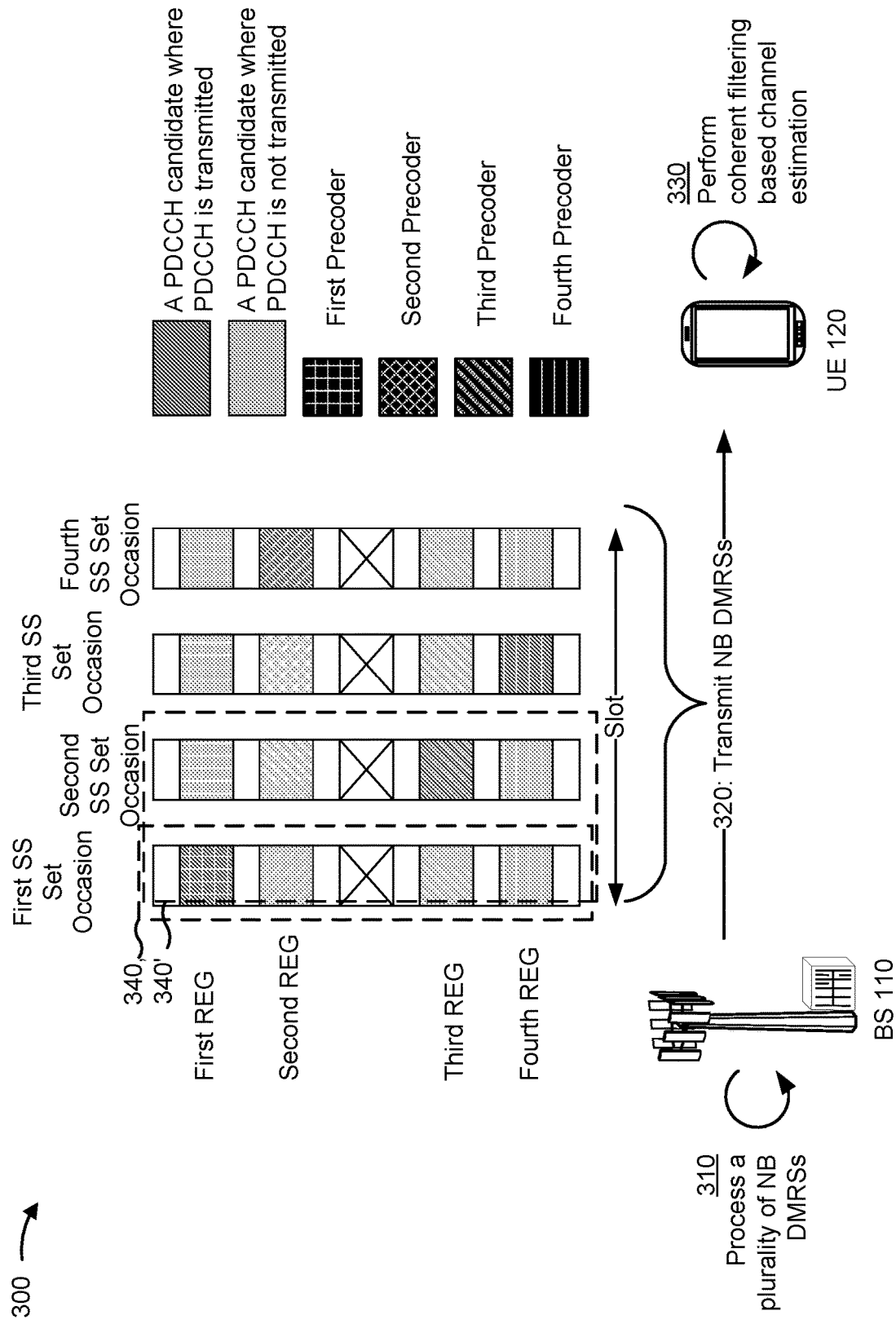
FIG. 3 is a diagram illustrating an example of narrowband demodulation reference signal bundling for physical downlink control channels, in accordance with various aspects of the present disclosure.

FIG. 3 is a diagram illustrating an example 300 of narrowband demodulation reference signal bundling for physical downlink control channels, in accordance with various aspects of the present disclosure. As shown in FIG. 3, example 300 includes a UE 120 and a BS 110.

As further shown in FIG. 3, and by reference number 310, BS 110 may process a plurality of NB DMRSs. For example, BS 110 may use a common precoder to process the plurality of NB DMRSs for across a plurality of SS set occasions. In this case, BS 110 may determine to use a first precoder for a first REG of each SS set occasion, a second precoder for a second REG of each SS set occasion, a third precoder for a third REG of each SS set occasion, and a fourth precoder for a fourth REG of each SS set occasion. In some aspects, BS 110 may determine which PDCCH candidate to use for transmitting a PDCCH conveying an NB DMRS. For example, BS 110 may determine to use a first REG in a first SS set occasion, a third REG in a second SS set occasion, a fourth REG in a third SS set occasion, and a second REG in a fourth SS set occasion. In this way, BS 110 avoids transmitting each NB DMRS using a same REG and a different precoder and avoids transmitting each NB DMRS using a different REG and a same precoder. In this way, BS 110 enables coherent filtering by UE 120, thereby enabling improved channel estimation.

Additionally, or alternatively, BS 110 may use different precoders in a same REG rather than a same precoder in a same REG. For example, rather than using the same precoder for each first REG of each SS set occasion, BS 110 may use different precoders that vary in time with phase continuity. In this case, an equivalent channel may be phase continuous, which may enable UE 120 to perform coherent filtering, thereby enabling improved channel estimation.

As further shown in FIG. 3, and by reference number 320, BS 110 may transmit the plurality of NB DMRSs. In some aspects, when BS 110 performs DMRS bundling for transmitting the plurality of NB DMRSs, BS 110 may perform the DMRS bundling for a single SS set in a single slot in accordance with a first rule, as described herein. In this case, a CCE offset may be fixed across all SS set occasions in the slot. For example, as shown, BS 110 may transmit the plurality of NB DMRSs within a union of REGs of each PDCCH for each aggregation level configured for a plurality of SS set occasions. In this case, BS 110 transmits an NB DMRS in the first REG in the first SS set occasion, the third REG in the second SS set occasion, the fourth REG in a third SS set occasion, and the second REG in a fourth SS set occasion. In some aspects, a plurality of aggregation levels may be configured for the plurality of SS set occasions. For example, BS 110 may transmit the plurality of NB DMRS within a union of REGs of each PDCCH for a first aggregation level and for a second aggregation level. Additionally, or alternatively, only a single aggregation level may be configured for the plurality of SS set occasions.

In some aspects, when BS 110 performs DMRS bundling for transmitting the plurality of NB DMRSs, BS 110 may perform the DMRS bundling across a plurality of SS sets in a single slot, in accordance with a second rule, as described herein. In this case, the CCE offset may be fixed across all SS set occasions for each of the plurality of SS sets in the single slot. For example, BS 110 may transmit NB DMRSs within the union of REGs of each PDCCH candidate for each aggregation level in each SS set occasion. In this case, BS 110 may transmit an NB DMRS, of the NB DMRSs, in a particular PDCCH candidate, of the PDCCH candidates, when a PDCCH is transmitted in a particular PDCCH candidate and/or when the PDCCH is not transmitted in the particular PDCCH candidate.

In some aspects, BS 110 may transmit a PDCCH candidate of a first SS set in a first REG bundle, and may transmit NB DMRSs in the first REG bundle in other corresponding SS set occasions of each other SS set. In this way, BS 110 accounts for different aggregation levels or quantities of PDCCH candidates being configured for different SS sets. Furthermore, BS 110 accounts for differing CCE offsets for a channel search space (CSS), a uniform search space (USS), and/or the like. In some aspects, the plurality of SS sets may be a plurality of CSS sets or may be configured with a common aggregation level or a common quantity of candidates. In some aspects, BS 110 may use the same precoder for each NB DMRS in the same REG (e.g., REGs with a common index value) across a plurality of SS set occasions. In some aspects, when BS 110 performs DMRS bundling for transmitting the plurality of NB DMRSs, BS 110 may perform the DMRS bundling across a plurality of SS sets in a plurality of contiguous slots, in accordance with a third rule, as described herein. In this case, the CCE offset may be fixed across all SS set occasions for each CSS set in the plurality of contiguous slots, but the CCE offset may be different for different USSs. In some aspects, BS 110 performs DMRS bundling in multiple SS sets, in multiple contiguous slots, and/or the like. In some aspects, BS 110 may perform DMRS bundling for each possible location for a DMRS.

In some aspects, BS 110 may apply at least one of the plurality of rules, as described above, for selecting the REGS and/or precoders to use for processing and/or transmitting NB DMRSs. For example, BS 110 may apply the first rule to a first part of a slot (e.g., 7 OFDM symbols) and the second rule to a second part of a slot. Additionally, or alternatively, BS 110 may apply the plurality of rules independently to a same slot. For example, when using a USS for DMRS bundling, BS 110 may apply the first rule and the second rule, resulting in differing NB DMRS transmission configurations for different slots. Similarly, BS 110 may apply the third rule to some slots. For example, when applying the first rule and the second rule, BS 110 may independently apply the third rule to every nth slot. In some aspects, BS 110 may apply a rule to a subset of SS occasions of one or more SS sets. For example, BS 110 may apply the third rule to every mth SS occasion of one or more SS sets.

As further shown in FIG. 3, and by reference number 330, based at least in part on receiving the plurality of NB DMRSs, UE 120 may perform coherent filtering on the plurality of NB DMRSs and may perform channel estimation using a result of performing coherent filtering. As shown by reference number 340, UE 120 may determine an SS set occasion where a scheduling PDCCH is detected. In this case, UE 120 may rate match a PDSCH in resources 341' available for the PDSCH and around resources for the scheduling PDCCH. In other words, resources corresponding to a union of the scheduling PDCCH and an associated PDCCH DMRS may not be available for a PDSCH, and UE 120 may rate match the PDSCH around the resources that are not available. For example, UE 120 may determine that a PDSCH is rate matched around a corresponding scheduling PDCCH and an NB DMRS is configured with NB DMRS bundling enabled, and UE 120 may identify resources corresponding to the union of the scheduling PDCCH and the associated PDCCH DMRS as not being available for the PDSCH. As a result, UE 120 may rate match the PDSCH around the resources. In some aspects, the PDCCH DMRS may include an NB DMRS transmitted in REGs of the PDCCH and an NB DMRS transmitted in other REGs not of the PDCCH as a result of DMRS bundling.

As indicated above, FIG. 3 is provided as an example. Other examples may differ from what is described with respect to FIG. 3.

Figure 4:
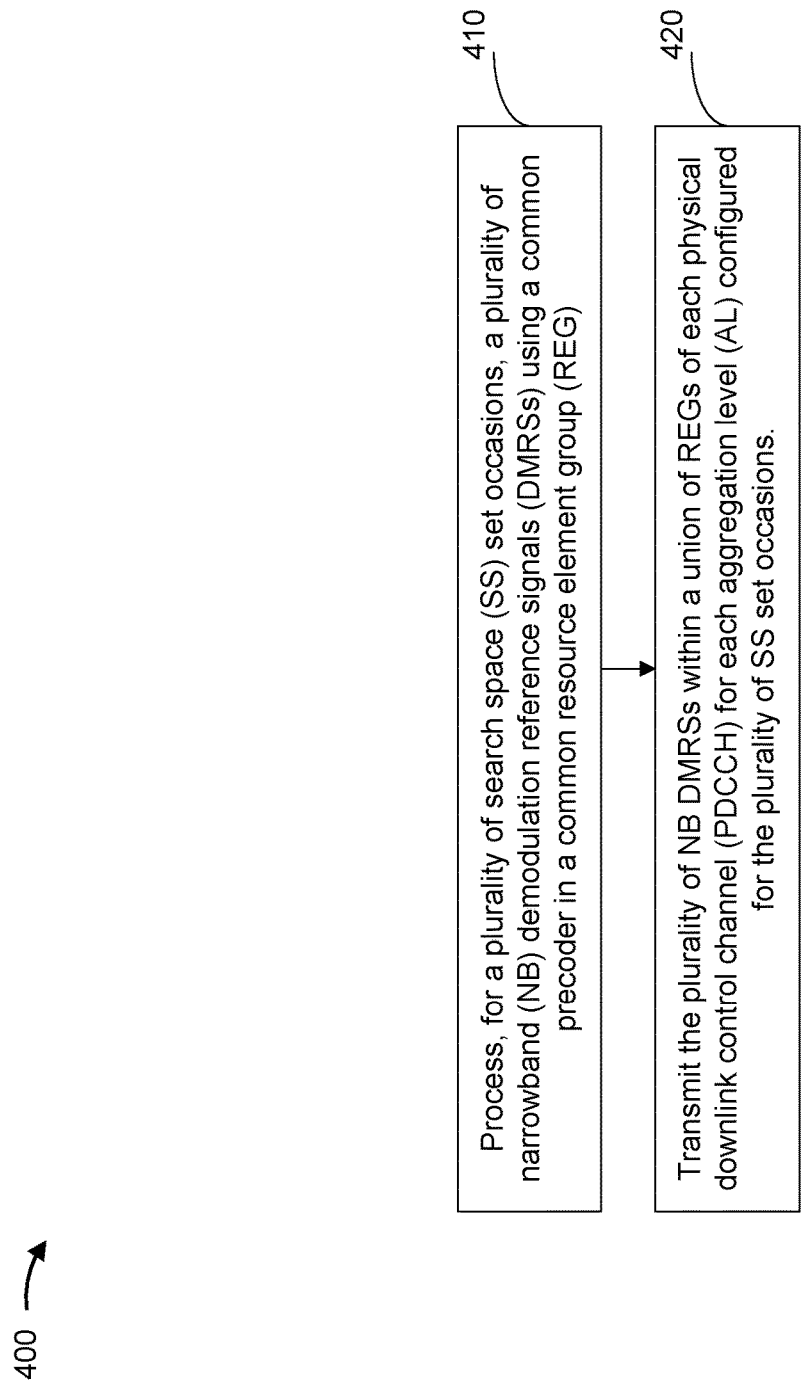
FIG. 4 is a diagram illustrating an example process performed, for example, by a user equipment, in accordance with various aspects of the present disclosure.

FIG. 4 is a diagram illustrating an example process 400 performed, for example, by a BS, in accordance with various aspects of the present disclosure. Example process 400 is an example where a BS (e.g., BS 110 and/or the like) performs operations associated with narrowband demodulation reference signal bundling for physical downlink control channels.

As shown in FIG. 4, in some aspects, process 400 may include processing, for a plurality of search space (SS) set occasions, a plurality of narrowband (NB) demodulation reference signals (DMRSs) using a common precoder in a common resource element group (REG) (block 410). For example, the BS (e.g., using transmit processor 220, receive processor 238, controller/processor 240, memory 242, and/or the like) may process, for a plurality of SS set occasions, a plurality of NB DMRSs using a common precoder in a common REG, as described above.

As further shown in FIG. 4, in some aspects, process 400 may include transmitting the plurality of NB DMRSs within a union of REGs of each physical downlink control channel (PDCCH) for each aggregation level (AL) configured for the plurality of SS set occasions (block 420). For example, the BS (e.g., using transmit processor 220, receive processor 238, controller/processor 240, memory 242, and/or the like) may transmit the plurality of NB DMRSs within a union of REGs of each PDCCH for each AL configured for the plurality of SS set occasions, as described above.

Process 400 may include additional aspects, such as any single aspect or any combination of aspects described below and/or in connection with one or more other processes described elsewhere herein.

In a first aspect, the plurality of NB DMRSs are bundled for a single SS set of the plurality of SS set occasions and for at least one slot.

In a second aspect, alone or in combination with the first aspect, a control channel element (CCE) offset is fixed across the plurality of SS set occasions and for the at least one slot.

In a third aspect, alone or in combination with one or more of the first and second aspects, a single AL is configured for the plurality of SS set occasions.

In a fourth aspect, alone or in combination with one or more of the first through third aspects, a REG bundle is used by a PDCCH candidate of at least one SS set occasion of the plurality of SS set occasions.

In a fifth aspect, alone or in combination with one or more of the first through fourth aspects, process 400 may include transmitting at least one of the plurality of NB DMRSs in the REG bundle in each other SS set occasion of the plurality of SS set occasions.

In a sixth aspect, alone or in combination with one or more of the first through fifth aspects, the plurality of NB DMRSs are bundled for a plurality of SS sets of the plurality of SS set occasions and for at least one slot.

In a seventh aspect, alone or in combination with one or more of the first through sixth aspects, in the at least one slot, a control channel element (CCE) offset is fixed across the plurality of SS set occasions and for the plurality of SS sets.

In an eighth aspect, alone or in combination with one or more of the first through seventh aspects, the plurality of NB DMRSs are bundled for a plurality of SS sets of the plurality of SS set occasions and for a plurality of contiguous slots.

In a ninth aspect, alone or in combination with one or more of the first through eighth aspects, in the plurality of contiguous slots, a control channel element (CCE) offset is fixed across the plurality of SS set occasions and for a plurality of common search space (CSS) sets in the plurality of contiguous slots.

In a tenth aspect, alone or in combination with one or more of the first through ninth aspects, a first slot, of the plurality of contiguous slots, is associated with a first common search space (CSS) and a second slot, of the plurality of contiguous slots, is associated with a second CSS that is different from the first CSS.

In an eleventh aspect, alone or in combination with one or more of the first through tenth aspects, the common precoder is used for a subset of symbols of a slot.

In a twelfth aspect, alone or in combination with one or more of the first through eleventh aspects, the common precoder is a first common precoder applied to first NB DMRS transmissions of a first slot and a second common precoder is applied to second NB DMRS transmissions of a second slot.

In a thirteenth aspect, alone or in combination with one or more of the first through twelfth aspects, the first NB DMRS transmissions are different from the second NB DMRS transmissions, and the first slot and the second slot are associated with a uniform search space (USS) for which DMRS bundling is performed.

In a fourteenth aspect, alone or in combination with one or more of the first through thirteenth aspects, the common precoder is used for a subset of slots of a plurality of contiguous slots.

In a fifteenth aspect, alone or in combination with one or more of the first through fourteenth aspects, the common precoder is used for a subset of SS set occasions of the plurality of SS set occasions.

In a sixteenth aspect, alone or in combination with one or more of the first through fifteenth aspects, the common precoder is a variable precoder that varies in time based at least in part on phase continuity.

In a seventeenth aspect, alone or in combination with one or more of the first through sixteenth aspects, a channel of the plurality of NB DMRSs is phase continuous and coherently filterable.

In an eighteenth aspect, alone or in combination with one or more of the first through seventeenth aspects, a first NB DMRS, of the plurality of NB DMRSs, is transmitted within the union of REGs during a first SS set occasion, of the plurality of SS set occasions. In some aspects, PDCCH resource is allocated. In some aspects, a second NB DMRS, of the plurality of NB DMRSs, is transmitted within the union of REGs during a second SS set occasion, of the plurality of SS set occasions. In some aspects, no resource is allocated for PDCCH.

In a nineteenth aspect, alone or in combination with one or more of the first through eighteenth aspects, the plurality of NB DMRSs are bundled for a single SS set of the plurality of SS set occasions and for at least one slot.

In a twentieth aspect, alone or in combination with one or more of the first through nineteenth aspects, the plurality of NB DMRSs are transmitted within the union of REGs of all PDCCH candidates for all ALs configured for the single SS set and within first SS set occasions and second SS set occasions of the plurality of SS set occasions.

In a twenty first aspect, alone or in combination with one or more of the first through twentieth aspects, a single AL is configured for the plurality of SS set occasions.

In a twenty second aspect, alone or in combination with one or more of the first through twenty first aspects, the plurality of NB DMRSs are bundled for a plurality of SS sets of the plurality of SS set occasions and for at least one slot.

In a twenty third aspect, alone or in combination with one or more of the first through twenty second aspects, an NB DMRS, of the plurality of NB DMRSs, is transmitted within the union of REGs of all PDCCH candidates for all ALs in a slot and within the first SS set occasions and second SS set occasions of the plurality of SS set occasions.

In a twenty fourth aspect, alone or in combination with one or more of the first through twenty third aspects, an NB DMRS, of the plurality of NB DMRSs, is transmitted within the union of REGs of a PDCCH candidate used in all SS set occasions of the plurality of SS set occasions.

In a twenty fifth aspect, alone or in combination with one or more of the first through twenty fourth aspects, the plurality of NB DMRSs are bundled for a plurality of SS sets of the plurality of SS set occasions and for a plurality of contiguous slots.

In a twenty sixth aspect, alone or in combination with one or more of the first through twenty fifth aspects, an NB DMRS, of the plurality of NB DMRSs, is transmitted within a union of REGs of all PDCCH candidates for all ALs in all SS set occasions, of the plurality of SS set occasions, and in the plurality of contiguous slots.

In a twenty seventh aspect, alone or in combination with one or more of the first through twenty sixth aspects, an NB DMRS, of the plurality of NB DMRSs, is transmitted within a union of REGs of a PDCCH candidates for all ALs in all SS set occasions, of the plurality of SS set occasions, and in the plurality of contiguous slots.

In a twenty eighth aspect, alone or in combination with one or more of the first through twenty seventh aspects, a configured NB DMRS bundling periodicity and a the common precoder are used for a subset of symbols of a slot.

In a twenty ninth aspect, alone or in combination with one or more of the first through twenty eighth aspects, The method of claim 12, NB DMRS transmission and bundling is independently performed for each slot of a plurality of slots.

In a thirtieth aspect, alone or in combination with one or more of the first through twenty ninth aspects, the configured NB DMRS bundling periodicity and the common precoder are used for a set of contiguous slots.

In a thirty first aspect, alone or in combination with one or more of the first through thirtieth aspects, the configured NB DMRS bundling periodicity and the common precoder are used for a set of contiguous slots associated with a set of configured channel search space (CSS) sets or a common CCE index.

In a thirty second aspect, alone or in combination with one or more of the first through thirty first aspects, a common precoder is used for NB DMRS bundling and the common precoder is a variable precoder matrix associated with a common bundling REG or a time variable precoder that maintains phase continuity.

In a thirty third aspect, alone or in combination with one or more of the first through thirty second aspects, a channel of the plurality of NB DMRSs is phase continuous and coherently filterable.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
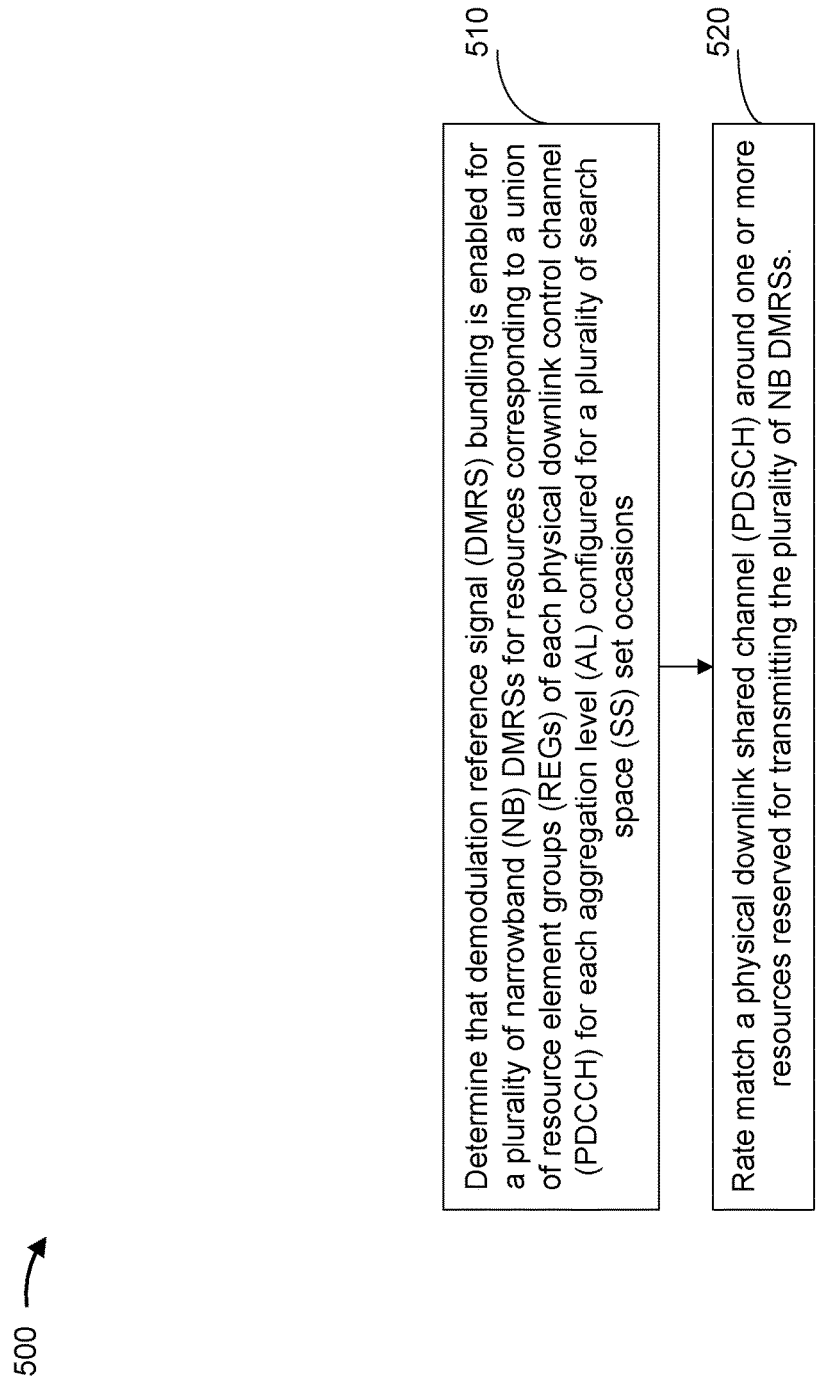
FIG. 5 is a diagram illustrating an example process performed, for example, by a base station, in accordance with various aspects of the present disclosure.

FIG. 5 is a diagram illustrating an example process 500 performed, for example, by a user equipment, in accordance with various aspects of the present disclosure. Example process 500 is an example where a UE (e.g., UE 120 and/or the like) performs operations associated with narrowband demodulation reference signal bundling for physical downlink control channels.

As shown in FIG. 5, in some aspects, process 500 may include determining that demodulation reference signal (DMRS) bundling is enabled for a plurality of narrowband (NB) DMRSs for resources corresponding to a union of resource element groups (REGs) of each physical downlink control channel (PDCCH) for each aggregation level (AL) configured for a plurality of search space (SS) set occasions (block 510). For example, the UE (e.g., using receive processor 258, transmit processor 264, controller/processor 280, memory 282, and/or the like) may determine that DMRS bundling is enabled for a plurality of NB DMRSs for resources corresponding to a union of REGs of each PDCCH for each AL configured for a plurality of SS set occasions, as described above.

As further shown in FIG. 5, in some aspects, process 500 may include rate matching a physical downlink shared channel (PDSCH) around one or more resources reserved for transmitting the plurality of NB DMRSs (block 520). For example, the UE (e.g., using receive processor 258, transmit processor 264, controller/processor 280, memory 282, and/or the like) may rate match a PDSCH around one or more resources reserved for transmitting the plurality of NB DMRSs, as described above.

Process 500 may include additional aspects, such as any single aspect or any combination of aspects described below and/or in connection with one or more other processes described elsewhere herein.

In a first aspect, transmitting the plurality of NB DMRSs includes receiving a first NB DMRS in a first REG included in the PDCCH, and receiving a second NB DMRS in a second REG not included in the PDCCH.

In a second aspect, alone or in combination with the first aspect, process 500 includes rate matching around both the first NB DMRS and the second NB DMRS.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a base station (BS), comprising:
    processing, for a plurality of search space (SS) set occasions, a plurality of narrowband (NB) demodulation reference signals (DMRSs) using a common precoder in a common resource element group (REG); and
    transmitting the plurality of NB DMRSs within a union of REGs of each physical downlink control channel (PDCCH) for each aggregation level (AL) configured for the plurality of SS set occasions.

2. The method of claim 1, wherein a first NB DMRS, of the plurality of NB DMRSs, is transmitted within the union of REGs during a first SS set occasion, of the plurality of SS set occasions wherein PDCCH resource is allocated, and
    wherein a second NB DMRS, of the plurality of NB DMRSs, is transmitted within the union of REGs during a second SS set occasion, of the plurality of SS set occasions wherein no resource is allocated for PDCCH.

3. The method of claim 1, wherein the plurality of NB DMRSs are bundled for a single SS set of the plurality of SS set occasions and for at least one slot.

4. The method of claim 3, wherein the plurality of NB DMRSs are transmitted within the union of REGs of each PDCCH candidate for each AL configured for the single SS set and within first SS set occasions and second SS set occasions of the plurality of SS set occasions.

5. The method of claim 3, wherein a single AL is configured for the plurality of SS set occasions.

6. The method of claim 1, wherein the plurality of NB DMRSs are bundled for a plurality of SS sets of the plurality of SS set occasions and for at least one slot.

7. The method of claim 6, wherein an NB DMRS, of the plurality of NB DMRSs, is transmitted within the union of REGs of each PDCCH candidate for each AL in a slot and within the first SS set occasions and second SS set occasions of the plurality of SS set occasions.

8. The method of claim 6, wherein an NB DMRS, of the plurality of NB DMRSs, is transmitted within the union of REGs of a PDCCH candidate used in each SS set occasion of the plurality of SS set occasions.

9. The method of claim 1, wherein the plurality of NB DMRSs are bundled for a plurality of SS sets of the plurality of SS set occasions and for a plurality of contiguous slots.

10. The method of claim 9, wherein an NB DMRS, of the plurality of NB DMRSs, is transmitted within a union of REGs of each PDCCH candidate for each AL in each SS set occasions, of the plurality of SS set occasions, and in the plurality of contiguous slots.

11. The method of claim 9, wherein an NB DMRS, of the plurality of NB DMRSs, is transmitted within a union of REGs of a PDCCH candidates for each ALs in each SS set occasion, of the plurality of SS set occasions, and in the plurality of contiguous slots.

12. The method of claim 1, wherein a configured NB DMRS bundling periodicity and a the common precoder are used for a subset of symbols of a slot.

13. The method of claim 12, NB DMRS transmission and bundling is independently performed for each slot of a plurality of slots.

14. The method of claim 12, wherein the configured NB DMRS bundling periodicity and the common precoder are used for a set of contiguous slots.

15. The method of claim 12, wherein the configured NB DMRS bundling periodicity and the common precoder are used for a set of contiguous slots associated with a set of configured channel search space (CSS) sets or a common CCE index.

16. The method of claim 1, wherein a common precoder is used for NB DMRS bundling and the common precoder is a variable precoder matrix associated with a common bundling REG or a time variable precoder that maintains phase continuity.

17. The method of claim 16, wherein a channel of the plurality of NB DMRSs is phase continuous and coherently filterable.

18. A method of wireless communication performed by a user equipment (UE), comprising:
    determining that demodulation reference signal (DMRS) bundling is enabled for a plurality of narrowband (NB) DMRSs for resources corresponding to a union of resource element groups (REGs) of each physical downlink control channel (PDCCH) for each aggregation level (AL) configured for a plurality of search space (SS) set occasions; and
    rate matching a physical downlink shared channel (PDSCH) around one or more resources reserved for transmitting the plurality of NB DMRSs.

19. The method of claim 18, wherein transmitting the plurality of NB DMRSs comprises:
    receiving a first NB DMRS in a first REG included in the PDCCH; and
    receiving a second NB DMRS in a second REG not included in the PDCCH.

20. The method of claim 19, further comprising:
rate matching around both the first NB DMRS and the second NB DMRS.

21. A base station (BS) for wireless communication, comprising:
a memory; and
one or more processors operatively coupled to the memory, the memory and the one or more processors configured to:
process, for a plurality of search space (SS) set occasions, a plurality of narrowband (NB) demodulation reference signals (DMRSs) using a common precoder in a common resource element group (REG); and
transmit the plurality of NB DMRSs within a union of REGs of each physical downlink control channel (PDCCH) for each aggregation level (AL) configured for the plurality of SS set occasions.

22. A user equipment (UE) for wireless communication, comprising:
a memory; and
one or more processors operatively coupled to the memory, the memory and the one or more processors configured to:
determine that demodulation reference signal (DMRS) bundling is enabled for a plurality of narrowband (NB) DMRSs for resources corresponding to a union of resource element groups (REGs) of each physical downlink control channel (PDCCH) for each aggregation level (AL) configured for a plurality of search space (SS) set occasions; and
rate matching a physical downlink shared channel (PDSCH) around one or more resources reserved for transmitting the plurality of NB DMRSs.

* * * * *